(12) United States Patent
Chupka et al.

(10) Patent No.: US 6,193,073 B1
(45) Date of Patent: *Feb. 27, 2001

(54) PAPER STOCK SCREENING APPARATUS AND METHOD

(75) Inventors: David E. Chupka; Peter Seifert, both of Middletown; Christopher M. Vitori, Mason, all of OH (US)

(73) Assignee: Thermo Black Clawson Inc., Middletown, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,412

(22) Filed: Aug. 6, 1998

Related U.S. Application Data

(60) Provisional application No. 60/054,848, filed on Aug. 6, 1997.

(51) Int. Cl.[7] .............................. B07B 1/50; B07B 1/28; B07B 1/04; B07B 1/20
(52) U.S. Cl. .......................... 209/379; 209/268; 209/273; 209/305; 209/306; 209/385; 209/389; 209/300
(58) Field of Search .................................. 209/268, 273, 209/306, 304, 270, 305, 379, 385, 384, 389, 293, 288, 300

(56) References Cited

U.S. PATENT DOCUMENTS

| | | | |
|---|---|---|---|
| 3,865,243 | * 2/1975 | Salminen | 209/240 |
| 4,166,028 | * 8/1979 | Weber | 209/306 |
| 4,213,823 | * 7/1980 | Wittig et al. | 209/273 |
| 4,238,324 | * 12/1980 | Musselmann et al. | 209/273 |
| 4,267,035 | 5/1981 | Martin | 209/273 |
| 4,302,327 | * 11/1981 | Martin | 209/240 |
| 4,851,111 | 7/1989 | Martin et al. | 209/304 |
| 4,927,529 | * 5/1990 | Henricson et al. | 209/270 |
| 5,000,842 | * 3/1991 | Ljokkoi | 209/273 |
| 5,041,212 | * 8/1991 | Gero et al. | 209/273 |
| 5,147,543 | * 9/1992 | Frejborg | 209/273 |
| 5,267,035 | * 11/1993 | Martin | 209/306 |
| 5,307,939 | * 5/1994 | Young et al. | 209/270 |
| 5,318,186 | 6/1994 | Rienecker | 209/273 |
| 5,385,240 | * 1/1995 | Egan et al. | |
| 5,476,178 | * 12/1995 | Lamort | 209/273 |
| 5,645,724 | * 7/1997 | Lamort | 209/273 |

FOREIGN PATENT DOCUMENTS

2384889 * 11/1978 (FR) ....................................... 209/306

* cited by examiner

*Primary Examiner*—Donald P. Walsh
*Assistant Examiner*—Daniel Schlak
(74) *Attorney, Agent, or Firm*—Biebel & French

(57) ABSTRACT

Pressure screening apparatus for screening a suspension of paper fiber stock employs a rotor in which a single impulse or foil member is carried or positioned to move along a discrete portion of the screen surface. This arrangement improves efficiency of operation of the pressure screen by reducing the rotational effect of the rotor on the stock suspension being screened and by providing a less disturbed screening region through which the single foil operates. Embodiments are shown in which multiple single impulse elements sweep over discrete portions of a screen and in which a single foil is combined, in screening apparatus, with multiple foils in accordance with the increase in consistency of the stock as it passes through the screen.

4 Claims, 5 Drawing Sheets

PAPER STOCK SCREENING APPARATUS AND METHOD

PRIOR PROVISIONAL APPLICATION

Applicant claims the benefit of the filing date of Provisional Application Ser. No. 60/054,848, filed Aug. 6, 1997.

BACKGROUND OF THE INVENTION

This invention relates to the rotating pressure screening of screening paper fiber stock.

The term "foil" or "impulse member" as used herein is not necessarily limited to hydrodynamically-shaped elements or elements that resemble air foil sections, although the latter are commonly used for impulse foils in rotating apparatus for screening paper fiber stock. However, these terms are intended to apply to any kind, and any shape, of a disrupter which may be, for example, a protuberance on the surface of a drum-type rotor.

In the pressure screening of paper fiber stock for removing impurities or for fractionating suspensions of paper fibers in a pulp slurry, it is common practice to provide a rotor that has multiple impulse members mounted on arms or mounted on a support drum, with respect to a discreet area or surface of a screen. Thus, as an example in such a pressure screen, equally spaced arms and attached foils may be mounted for rotation in close proximity to a screen surface, as shown for example in Weber U.S. Pat. No. 4,166,028, Martin U.S. Pat. No. 4,851,111 or Chupka U.S. Pat. No. 5,078,275. In such apparatus, as few as two arms and foils in diametric relation have been used, and arrangements with five, eight and eleven foils, have been tried. In those embodiments in which the foils are supported on radially extending arms, the use of three or more such arm-supported foils has become a preferred and common configuration. This preference has been used, in part, to create a more uniform distribution of impulse forces at the screen itself, so as to reduce screen flexure, stress, and possible breakage due to metal fatigue. On drum style rotors, two or more foil elements are used, for any given axial position or region of the rotor or cylinder.

Cylindrical screen baskets of the kind represented in U.S. Pat. Nos. 4,166,028 and 4,851,111 are commonly fed with incoming stock suspension at one axial end of the screen, as at the upper end, or at the lower end, as shown in the examples of these patents. The stock consistency is at its lowest value at the inlet end of a screen, and by reason water extraction through the screen the consistency increases to a maximum at the outlet end. The screening energy that is imparted to the stock by the rotating foils must be sufficient as to disrupt the fiber network and break up fiber flocs to allow the individual fibers and fines to flow through the openings or slots of the screen. Also, this energy causes contaminants within the fiber matrix to loosen and be separated by the screen from the accepted fiber.

Since screening is energy costly, it is desirable to have the energy intensity in the boundary layer on the screen plate surface close to the minimum that is required for the necessary fluidization of the fiber mass. If the energy intensity is too great, mixing turbulence occurs which reduces effective screening. On the other hand, if the energy intensity imparted by the foils is too low in the boundary layer at the screen inlet surface, the screening process becomes ineffective, and primarily only washing and dewatering of the fiber suspension will occur.

Since conventional screen rotors create a uniform impulse intensity over the axial length of a cylindrical screen, greater energy intensity is imparted to stock at the inlet end or inlet zone than is actually necessary to fluidize the lower consistency pulp. As a result, energy is wasted, and contaminants may be pushed through the screen openings. When an attempt is made to balance the condition by controlling the energy input, then the energy intensity at the outlet end can become too low to properly fluidize the thickened stock. Accordingly, a more energy effective screening can be accomplished by tailoring the rotor and foil design to individual screening zones.

Compensation for the change in stock consistency along the axial length of a cylindrical screen has been attempted by varying the spacing of protuberances on a drum-type rotor to a maximum clearance at the input end and a minimum clearance at the output end. However, this compensation technique is relatively ineffective since it results in a substantial spacing of the impulse inducing members from the screened surface at the inlet end, and well beyond the boundary layer at the screen inlet surface where fiber mat disruption is required for effective screening.

Accordingly there is a need for improved rotor designs which provide efficient screening with less overall energy.

SUMMARY OF THE INVENTION

Applicants have discovered that improved power, efficiency and screening in pressure screening apparatus may be achieved by rotor constructions that are provided, at least at the inlet end, with only a single rotating foil element at a given annular position or zone of the screen or the rotor. Embodiments incorporating this concept are disclosed.

A single foil rotating within a conventional cylinder type screen basket about an annular zone in close proximity to a screen surface has the advantage of effective disruption of the fiber mat at the screen surface with lower energy as compared to two or more such foils rotating at the same screen zone adjacent the same surface area at the same speed. The use of a single arm and foil has the important advantage that there is a corresponding lower tendency to cause the fluid mass within the basket to rotate, so that the foil moves through relatively undisturbed fluid regions throughout its circular path, undisturbed by turbulence induced by a preceding foil. Also, the relative velocity vectors over the foil are not reduced by the fact that the foils have caused the fluid mass within the cylinder to rotate in the same direction as that of the foils. In other words, the use of a single foil assures that the relative velocity between the foil and the fluid remains at the maximum and more nearly represents the actual rate of movement of the foil over the surface. Accordingly, the speed of foil movement can be reduced while obtaining the same production rate as with conventional multi-foil rotors.

Such a single foil rotor can, according to this invention, be used alone, or in combination with other single foil rotors, or in combination with conventional multiple foil rotor portions operating at regions of higher stock consistency within the screening member. Test results have indicated that the power consumption of foil-type screening apparatus is directly related to the number of foils that are employed so that power consumption can be reduced by the use of a single foil. This invention also permits fewer foils to be employed in general without decreasing the screening capacity of the apparatus, by placing a single foil at a screening zone near the inlet section of the screen where less energy is required, and by the use of a design in which only a single foil is rotated over a discrete annular portion or area of the screen.

A further aspect of the invention is a method of operating rotating impeller screening apparatus for screening or cleaning a suspension of paper fiber stock in water, having impurities therein, for removing the impurities from the stock. The method includes the steps of applying the stock suspension under pressure to the inlet surface of the screen, where the screen has screening openings that extend between an inlet surface and an outlet surface, and continuously rotating or causing to rotate, relative to the screen, a single disrupter only relative to and adjacent to one of said screening surfaces and causing a single moving disruption or pressure impulse at such surface to prevent blinding of the screen openings by the fibers or impurities in the stock. While the disclosure herein relates to the moving of a single disrupter only adjacent an inlet surface of the screen, the novel concepts of the invention may be achieved by causing a disrupting wave or a single disrupting wave or impulse wave to be applied at the outlet surface, and in either case, the advantages of the invention may be realized by rotating the screen relative to the disrupter or rotating the disrupter relative to the screen.

It is accordingly an important object of the invention to provide screening apparatus and method using only a single foil element sweeping along annular position of a screen, such as at a given axial position or zone of a screen cylinder. The single foil element may be supported by an arm or a plate, a drum, a ring or similar means.

A further object of the invention is the provision of apparatus and method, as outlined above, in which a screen member has a stock inlet or outlet surface along which only a single impulse foil is relatively moved, such as by a rotor or the like.

The provision of only a single foil for a given axial position of a cylinder screen raises the question of balance of the rotor. Balance problems could come from static, dynamic and external fluid dynamic forces. It is an object of the invention to provide means of balancing some or all of the forces.

Another object of the invention is the provision of a multi-stage rotor or multi-zone rotor in which the rotor is formed with or provided with a different number of foils at different positions on the rotor corresponding to changes in the consistency of the paper stock material being screened, in which at least one zone is fluidized by only one foil.

An additional object of the invention is the provision of screening apparatus of the kind outlined above, in which the rotor speed may be reduced to obtain the same effectiveness in screening, such as papermaking stock, thereby reducing energy consumption.

Other objects and advantages of the invention will be apparent from the following description, the accompanying drawings and the appended claims.

DETAILED DESCRIPTION OF PREFERRED EMBODIMENTS

Figure 1:
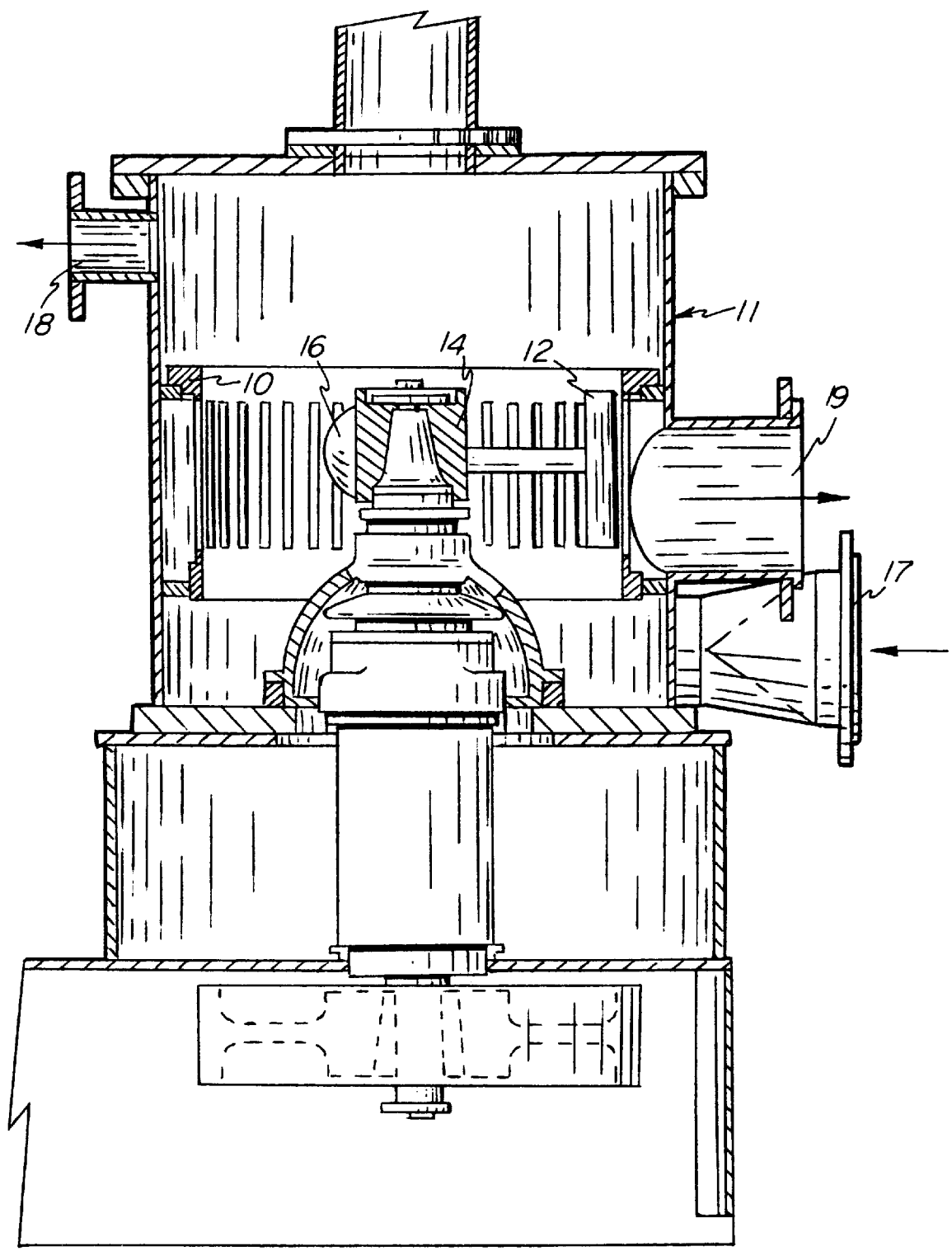
FIG. 1 is a side view, partially in section, of pressure screening apparatus in which a single foil is supported for rotation on an arm adjacent the inlet surface of a cylinder-shaped screen.
Figure 2:
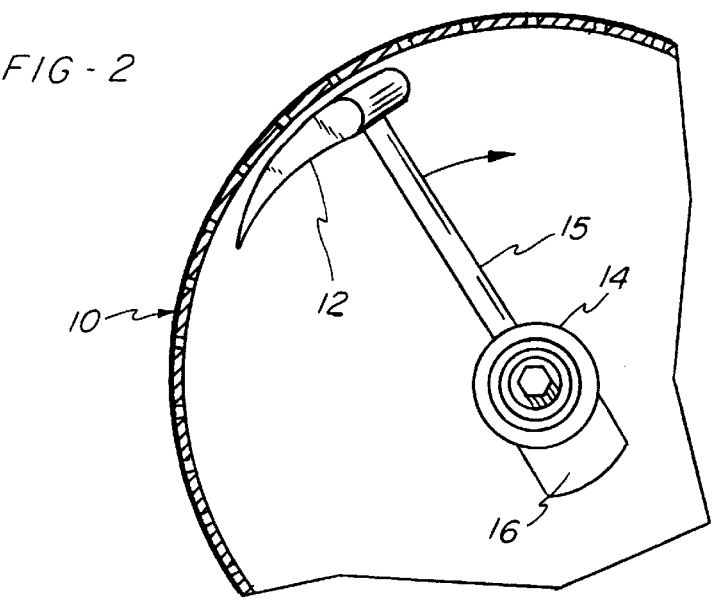
FIG. 2 is a diagrammatic plan view of the apparatus of FIG. 1.

Referring to FIGS. 1 and 2, the first embodiment of the invention, shows, in partial section, pressure screening apparatus for screening papermakers' stock in which a cylindrical screen 10 is received within a pressure housing 11. The overall apparatus may be that substantially as shown in the previously defined patent of Weber U.S. Pat. No. 4,166,028 incorporated herein by reference.

It will be understood that the pressure screening apparatus as shown in FIG. 1 and throughout the specification, includes the well known functional elements forming part of or within the housing 11. This includes an inlet 17 through which a stock suspension is applied to the screen 10 along the inner surface of the screen, usually flowing axially along the screen from a lower end of the screen in which the stock consistency is relatively low to an upper end of the screen in which the stock consistency is high. The portion of the suspension not screened comprises the rejects that move outwardly at the tops of the screen through an outlet 18. The consistency varies therefore along the screening surface of the screen. The screen 10 therefore divides the chamber within the housing 11 into a screening zone on one side of the screen, in this case, the inside of the screen, and an accepts zone on the radially opposite side of the screen which is in communication with the apparatus outlet 19.

In our invention FIGS. 1 and 2, a single screening foil 12 is supported from the hub 14 by a single arm 15 which may be counter weighted by a weight 16 for static and possibly dynamic balance. The foil 12 carried on the end of the arm 15 in this instance, may extend through or along the entire axial extent of the relevant inside or inlet screening surface of the screen 10.

A single foil rotor as shown in FIGS. 1 and 2 has been tested and proved effective in screening as requiring less horsepower input for the same screen throughput, and it is believed to be more effective than where two arms and two foils are used or when more than two foils are used along the same screening surface. This is believed to be due to the relatively undisturbed nature of the stock fluid suspension through which the single foil 12 is rotating (higher relative speed vectors) and also due to the concentration of the input energy between the foil 12 and the wall of the screen basket 10 at one rotating location rather than at two or more such locations.

Figure 3:
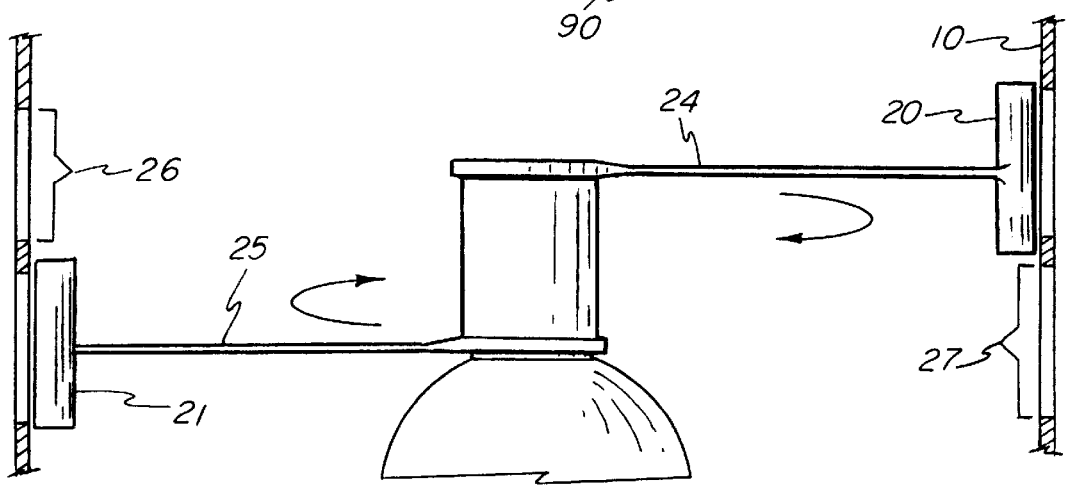
FIG. 3 is a modified form of the invention in which a pair of arms are spaced axially from each other and each supporting foils which mutually sweep distinctive portions or zones of the inlet surface of a screen cylinder basket.

FIG. 3 represents a drum-type rotor for use in a screen such as that illustrated in FIG. 1 in which two diametrically opposed foils 20 and 21 are mounted respectively on arms 24 and 25, in which the foils are axially displaced from each other with respect to the inside screening surface, in this case one above the other, so that each foil operates over a discrete axial portion of the cylinder screen. The arms 24 and 25 are offset from each other by 180°. Since, the two foils 20 and 21 move respectively through along separate axially displaced screening zones 26, 27, they move through relatively undisturbed regions of the fluid suspension in a rotor that is substantially balanced. Similarly, the single foil could be divided into three or more segments that are axially offset from each other, so that only one foil segment sweeps one given annular zone of the screen cylinder inlet surface.

Balancing a single foil rotor consists of several requirements which must all be fulfilled, as discussed below for a rotor, where the single foil is split into two parts, 180° offset from each other.

1. Static balance, by weight;
2. Dynamic balance—this requires that there is no resulting moment on the bearing system due to centrifugal forces. The foil part which is further away must be lighter (perhaps also shorter) than the part which is closer to the bearing system, in a cantilevered design. The weight masses would be approximately inversely proportioned to the distance from the bearings.
3. Hydraulic forces must be balanced also, creating equal radial forces and/or equal bending moment on the shaft. Optimization is required to provide the smoothest operating system.

Generally, the axial segments or parts of the single foil should be equal in weight and shape to avoid unequal or unstable twisting moments.

Figure 4:
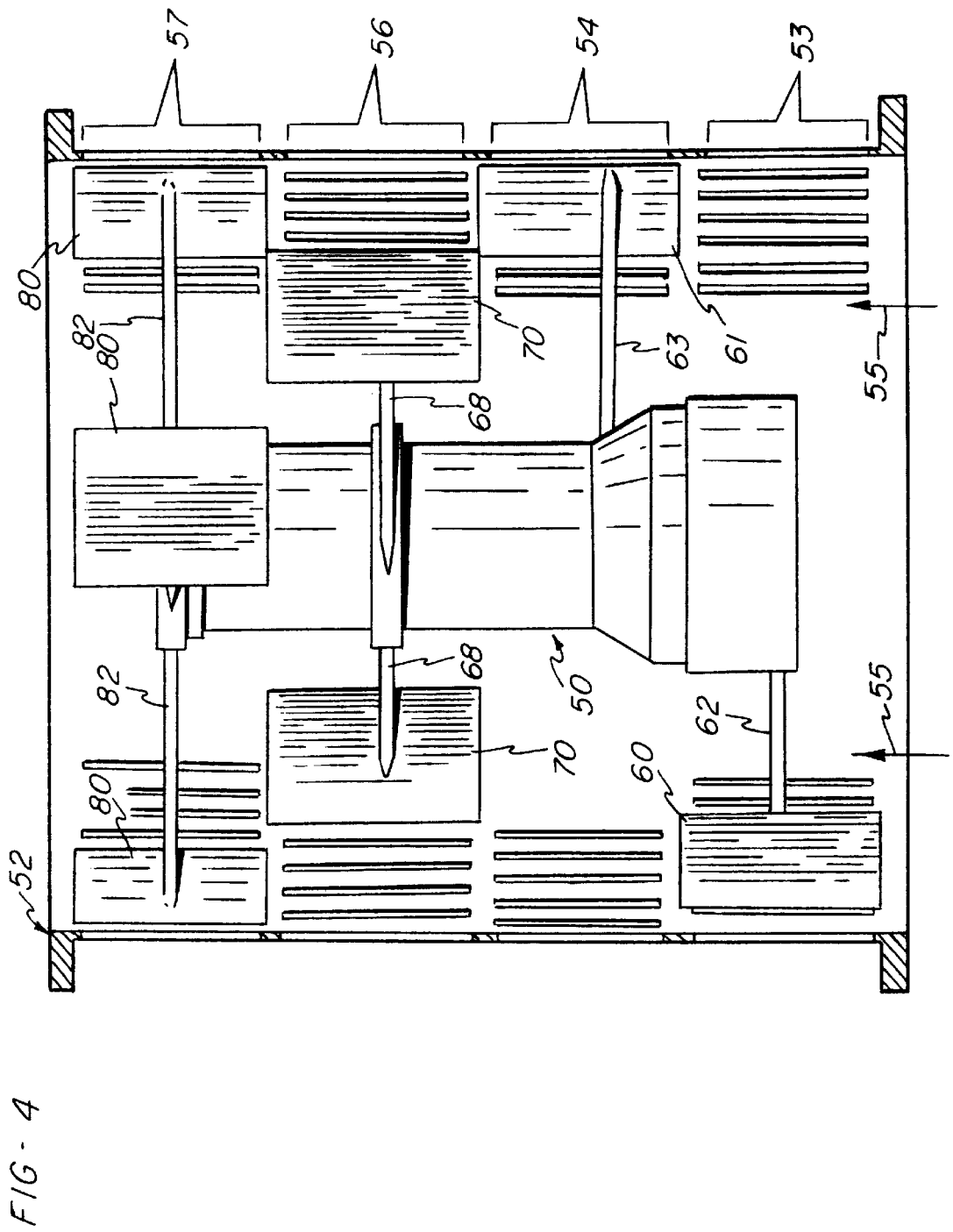
FIG. 4 is a further embodiment of the invention showing a multi-zone or multi-stage rotor incorporating both single and multiple foils.

The advantages of this invention may be applied to a multiple foil rotor 50 as shown in FIG. 4, within a screen 52. The rotor shown in FIG. 4 has particular advantage when used with larger screens, in which there can be a significant gain in efficiency by recognizing and accommodating the changes in the stock consistency. In this case, for the purpose of illustration, it may be assumed that the stock is entering the screen chamber from the bottom, such as in the direction of the arrows 55, so that the lower end of the screen 52, along its inside surface, has stock substantially equal to the inlet consistency of the stock suspension while the rejects outlet communicating with the upper end of the screen will have a stock at a substantially thickened, i.e. at a higher stock consistency.

The lower end of the screen 52 is assumed to be the inlet end, having the lower consistency stock suspension along its inside inlet surface, is screened by a pair of individual foils 60 and 61 mounted respectively from the rotor 50 on arms 62 and 63. The arms 62, 63 are opposed from each other at 180° intervals. The foils 60 and 61 operate respectively at discrete non-overlapping annular zones 53 and 54 along the inside surface of the screen 52. The respective foils, which may have a conventional air foil section as described in connection with the foils in FIGS. 1 and 2, and operate as single arms and single foils.

At an intermediate zone 56, a pair of arms 68 support conventional diametrically opposed foils 70. At the outlet region for the rejects of the screen 52, at zone 57, at a region of highest stock consistency, four equally spaced foils 80 are mounted on arms 82 and sweep the screen surface of that screen zone. Such a rotor 50 is therefore provided with screening impulse members that vary in aggressiveness from the inlet to the outlet although preferably each of the foils 60, 61, 70 and 80 are spaced in uniformly close running relation to the discrete non-overlapping screen surfaces that they sweep.

Figure 5:
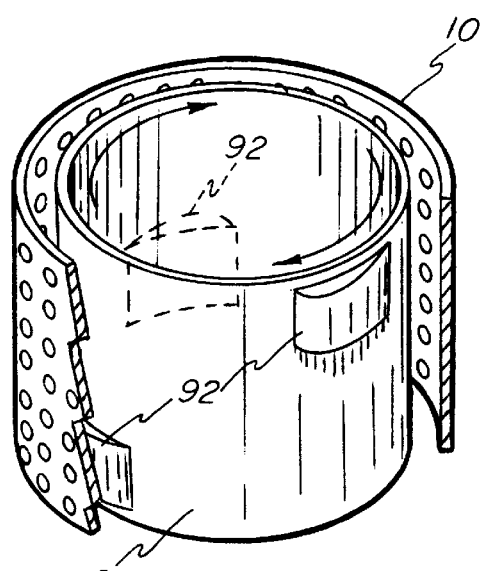
FIG. 5 is a perspective view of a drum-type rotor in accordance with this invention.

While this invention has been disclosed and described in connection with a cylindrical screen basket, it will be appreciated by those skilled in the art that the method or apparatus may be applied to non-cylindrical screen baskets, such as flat annular screens as shown in U.S. Pat. No. 5,078,275. Also, while the embodiments of the invention have been described in connection with foils or impulse members mounted on the extended ends of generally radially extending arms, it is within the scope of the invention to mount such elements on a supporting cylinder drum such as shown in U.S. Pat. 5,318,186. FIG. 5 illustrates an example of a drum-type rotor to which the invention is adapted. The drum rotor 90, which is commonly fed with stock material between the surface of the drum and the screen 10, is provided with exterior foils 92. In this instance, three such foils 92 are shown, each located on the rotor so as to cover or react with a discrete non-overlapping annular portions of the surrounding screen. The rotor may be balanced in the manner previously suggested.

Further, any rotor design shown in this application may be used with either an upflow or downflow pressure screen or may be used for pressure screens in which the inlet surface is either the inside surface or the outside surface of the screen.

It should also be understood that while the invention has been described herein in terms of foils which rotate adjacent to an inlet surface of a screen, the same advantages may be achieved in which the foils move along an outlet surface of the screen.

A series of tests were performed to determine the relative efficiency of a single foiled rotor, in a laboratory screen, as compared to multiple foil rotors. The test results are set out in Table I in which runs number 8844, 8845, 8846, 8847 and 8848 were performed with a single foiled rotor made in accordance with the teachings of FIGS. 1 and 2 of this application. The runs were at the speeds of 370, 477, 570, 637, and 850 rpm respectively. In a 24 inch cylinder screen, using a single foil to cover the entire inlet surface of the cylinder. Additional runs 8849, 8850 and 8851 were run at the 570 rpm speed in the same screen cylinder, run 8849 having four foils, each covering the entire height of the cylinder, run 8850 had three foils, and run 8851 had six foils. The furnish was a recycled liner board contaminated by 0.5% by weight of rubber shaving particles, and the efficiency was measured as the ratio of the particle area in the feed minus the particle area in the accepts divided by the particle area in the feed.

Figure 6:
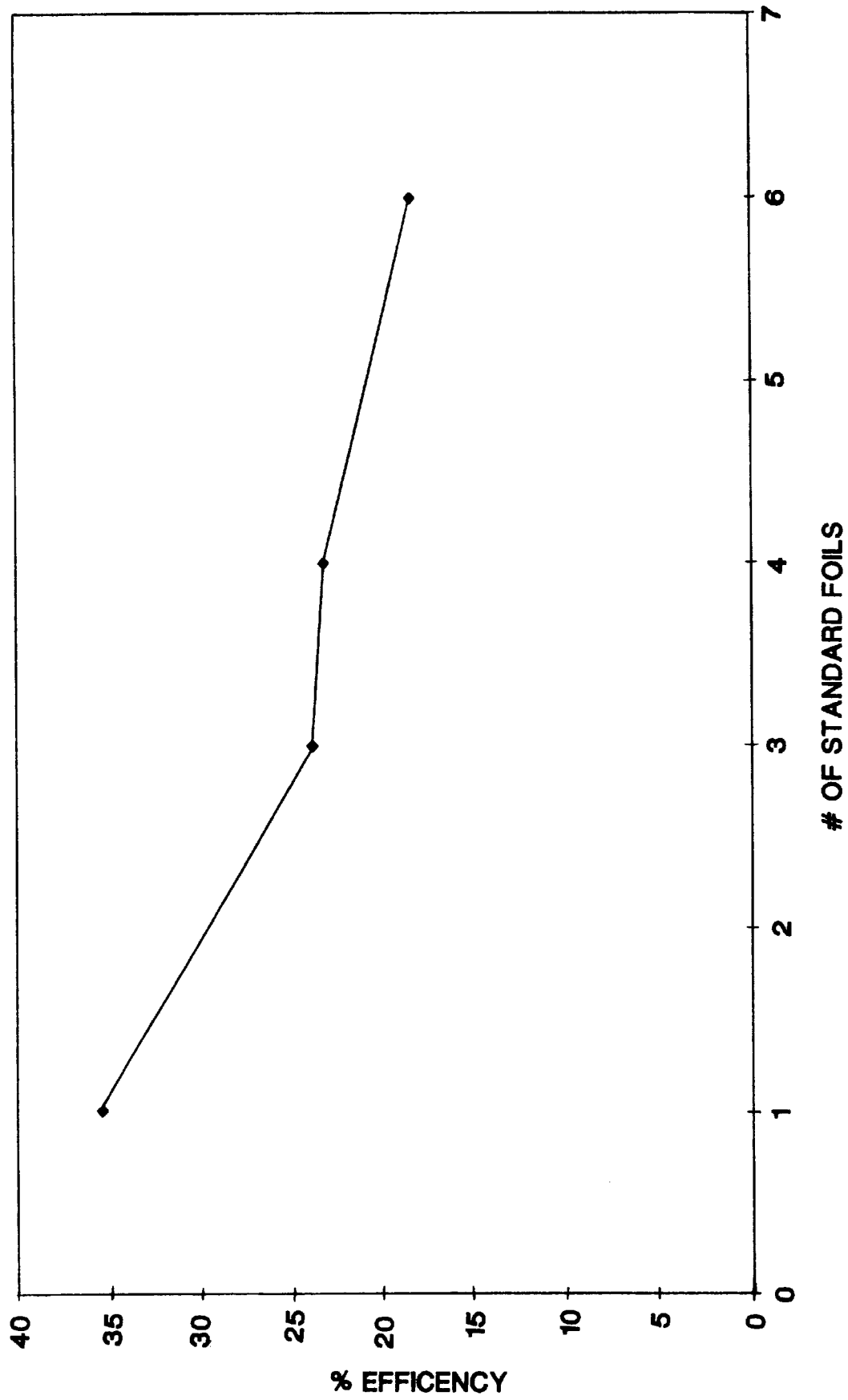
FIG. 6 is a graph showing % efficiency vs. number of foils.

The graph of FIG. 6 compares the measured efficiency of run 8846 using a single foil compared to runs 8849 using four foils, 8850 using three foils, and 8851 using six foils. It will be seen that the efficiency as measured using a single foil was substantially higher than any of the efficiencies using multiple foils.

Figure 7:
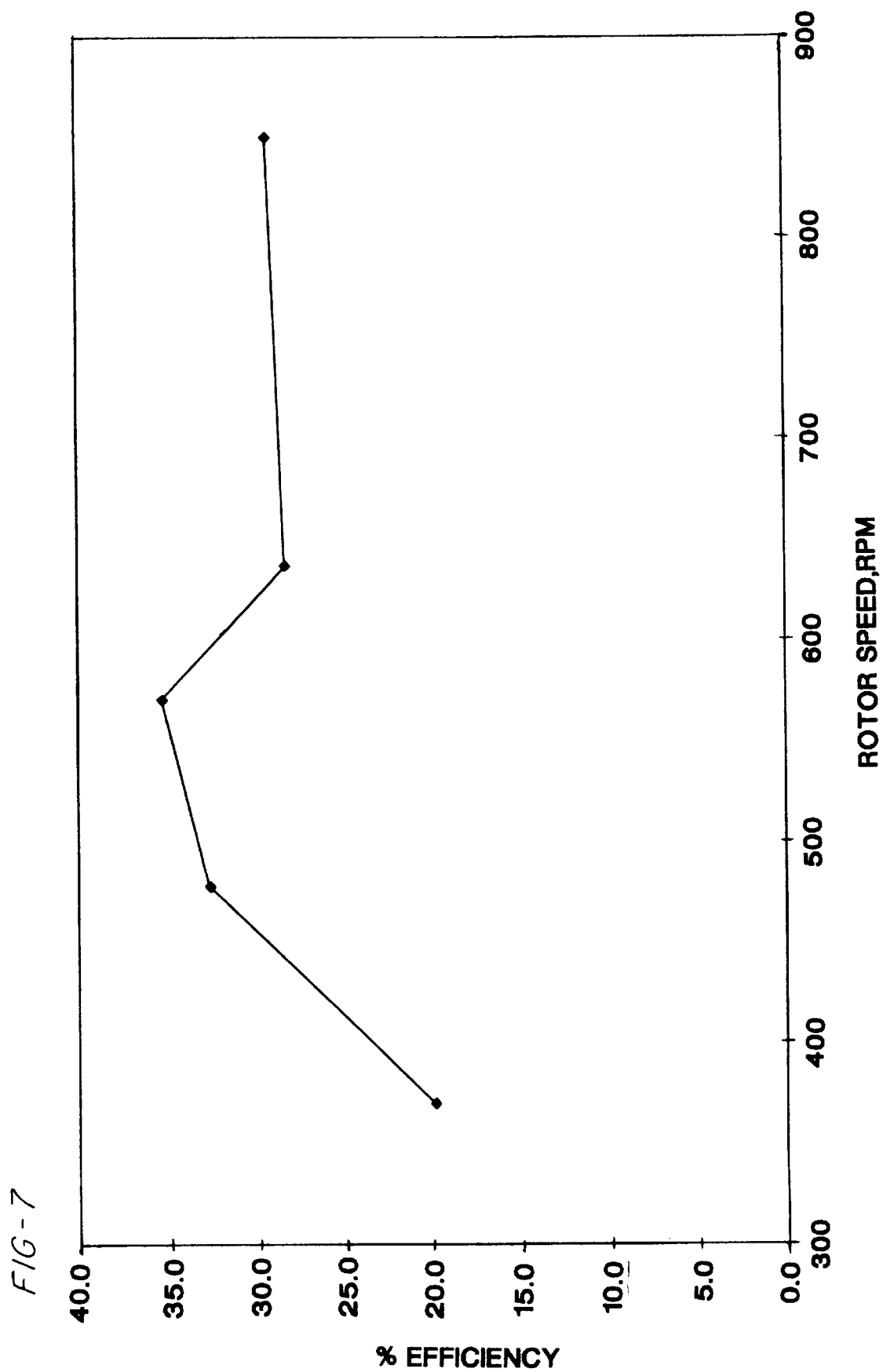
FIG. 7 is a graph showing % efficiency vs. rotor speed using one foil.

The graph of FIG. 7 compares the efficiency with rotor speed for runs 8844 to 8848 using a single foiled rotor vs. speed, with the highest efficiency occurring at about 570 rpm, the design recommended speed for the particular wedge wire cylinder used.

Table I and the graphs of FIGS. 6 and 7 show that for a given speed, the overall efficiency decreases as the number of foils increase, and the rotor with the least number of foils, namely one foil, had the best efficiency. The single foiled rotor showed improved efficiency as the rotor speed was increased from 350 to 570 rpm and then dropped off as the speed increased from 570 rpm to 850 rpm. The highest efficiency was obtained in run 8846 at the 570 rpm level recommended for the particular wedge wire screen. It may be concluded from these tests that a single foil rotor can improve the efficiency of existing multiple foil paper stock screening cylinders.

While the method forms of apparatus herein described constitute preferred embodiments of this invention, it is to be understood that the invention is not limited to the precise method or forms of apparatus, and that changes may be made therein without departing from the scope of the invention which is defined in the appended claims.

TABLE 1

| Run # | | 8844 | 8845 | 8846 | 8847 | 8848 | 8849 | 8850 | 8851 |
|---|---|---|---|---|---|---|---|---|---|
| Furnish | | \<-- recycled linerboard ~400 CSF --\> | | | | \<-- recycled linerboard ~400 CSF --\> | | | |
| Contaminant | | \<-- 0.5% by weight rubber shaving particles --\> | | | | \<-- 0.5% by weight rubber shaving particles --\> | | | |
| Stock Temp., deg. F | | ambient | ambient | ambient | ambient | ambient | ambient | ambient | ambient |
| Screen Type | | UV100 | UV100 | UV100 | UV100 | UV100 | UV100 | UV100 | UV100 |
| Cylinder Type | | Wedge Wire | Wedge Wire | Wedge Wire | Wedge Wire | Wedge Wire | Wedge Wire | Wedge Wire | Wedge Wire |
| Cylinder Diameter | | 24" | 24" | 24" | 24" | 24" | 24" | 24" | 24" |
| Hole/Slot Size | | 0.006" | 0.006" | 0.006" | 0.006" | 0.006" | 0.006" | 0.006" | 0.006" |
| # of Foils | | 1 | 1 | 1 | 1 | 1 | 4 | 3 | 6 |
| Foil Clearance | | 0.125 | 0.125 | 0.125 | 0.125 | 0.125 | 0.127 | 0.125 | 0.125 |
| Rotor Speed, rpm | | 370 | 477 | 570 | 637 | 850 | 570 | 570 | 570 |
| Connected Hp | | 100 | 100 | 100 | 100 | 100 | 100 | 100 | 100 |
| Consumed Hp | | 5 | 8 | 11 | 14 | 33 | 26 | 24 | 29 |
| Consistency | Feed | 1.29 | 1.29 | 1.29 | 1.29 | 1.29 | 1.27 | 1.27 | 1.27 |
| % | Accept | 1.17 | 1.15 | 1.16 | 1.17 | 1.23 | 1.22 | 1.21 | 1.22 |
| | Reject | 2.89 | 2.50 | 2.17 | 2.17 | 1.67 | 1.89 | 2.05 | 1.90 |
| Flow Rate | Feed | 304 | 318 | 322 | 335 | 330 | 336 | 321 | 323 |
| gpm | Accept | 278 | 282 | 280 | 288 | 280 | 285 | 279 | 282 |
| | Reject | 26 | 36 | 42 | 47 | 50 | 51 | 42 | 41 |
| | Dilution | | | | | | | | |
| Pulp Flow | Feed | 23.60 | 24.68 | 24.99 | 26.00 | 25.61 | 25.68 | 24.53 | 24.68 |
| OD t/d | Accept | 19.57 | 19.51 | 19.54 | 20.27 | 20.72 | 20.92 | 20.31 | 20.70 |
| | Reject | 4.52 | 5.42 | 5.48 | 6.14 | 5.02 | 5.80 | 5.18 | 4.69 |
| Pressure | Feed | 42 | 31 | 30.5 | 30 | 30 | 35 | 44 | 44.5 |
| psi | Accept | 38 | 28.5 | 28.5 | 28 | 29 | 33 | 41 | 42.5 |
| | Delta P | 4 | 2.5 | 2 | 2 | 1 | 2 | 3 | 2 |
| | Reject | | | | | | | | |
| | Dilution | | | | | | | | |
| Hydraulic Rej. Rate, % | | 8.6 | 11.3 | 13.0 | 14.0 | 15.12 | 15.2 | 13.1 | 12.7 |
| Pulp Reject Rate, % | | 19.2 | 21.9 | 21.9 | 23.6 | 19.6 | 22.6 | 21.1 | 19.0 |
| Thickening Factor | | 2.2 | 1.9 | 1.7 | 1.7 | 1.3 | 1.5 | 1.6 | 1.5 |
| Slot Velocity, m/s | | 1.0 | 1.0 | 1.0 | 1.0 | 1.0 | 1.0 | 1.0 | 1.0 |
| Efficiency, % | | 19.8 | 32.7 | 35.4 | 28.4 | 29.3 | 23.2 | 23.9 | 18.3 |

Cylinder Open Area = 27.46 square inches
% Efficiency = 100% * (Particle Area in Feed − Particle Area in Accepts)/(Particle Area in Feed)
Particle Area evaluated by scanning handsheets and using computer software to measure area in square millimeters.

What is claimed is:

1. A rotor for screening a suspension of paper fiber stock adapted to be mounted in such housing having impulse members thereon for movement along a surface of a cylindrical screen in which said screen surface defines at least an annular inlet zone, an annular intermediate zone, and an annular outlet zone in which the inlet zone receives such stock at a substantially lower consistency than at said intermediate and outlet zones, comprising a plurality of impulse foils supported on said rotor for movement by said rotor along said zones including not more than one said impulse foil positioned by said rotor for movement along said inlet zone, a first plurality of said foils supported by said rotor for movement along said intermediate zone, and a second and higher plurality of said foils supported for said rotor for movement along said outlet zone.

2. Pressure screening apparatus for screening a suspension of paper fiber stock comprising a housing, a cylindrical screen in said housing dividing said housing into a screening zone and an accepts zone, a rotor in said housing, means on said rotor defining a plurality of foils positioned on said rotor to move along said screen in said screening zone, said screening zone having a first zone portion which screens stock substantially at the inlet consistency of said stock, said rotor having one only of said foils positioned in said first zone portion whereby, upon rotation of said rotor, said one only foil may move through said stock undisturbed by a preceding foil and said rotor has a first plurality of foils supported thereon and moveable alone a second annular zone portion of said screen immediately adjacent said first zone portion whereby such stock is screened by said first plurality of foils at a consistency higher than said inlet consistency.

3. The apparatus of claim 2 in which said screen defines a third annular zone immediately adjacent said second annular zone and said rotor includes a second and higher plurality of foils supported thereon and moveable along said second zone for screening stock suspension at a higher consistency than at said second zone.

4. In a screening apparatus for pressure screening a suspension of paper fiber stock including a housing, an annular screen in the housing having two surfaces one of which defines an annular screening zone, a rotor in the housing, and an impulse member supported on said rotor and movable along one of said annular screen surfaces in close proximity by rotation of said rotor to disrupt fibers of the paper fiber stock along said zone, the improvement comprising only one said impulse member movable exclusively in closely spaced relation to said screen at said zone to the exclusion of any other members carried on said rotor in coaction with said zone whereby said impulse member moves through relatively undisturbed fluid regions about its annular path undisturbed by turbulence induced by any other member.

* * * * *